United States Statutory Invention Registration [19]

[11] Reg. Number: H961

Yu [43] Published: Sep. 3, 1991

[54] HEAT EXCHANGER AND HEATER

[75] Inventor: Daniel K. Yu, University Park, Md.

[73] Assignee: The United States of America as represented by the Secretary of the Army, Washington, D.C.

[21] Appl. No.: 600,882

[22] Filed: Oct. 22, 1990

[51] Int. Cl.[5] ..... F41H 9/06; F28D 7/10

[52] U.S. Cl. ..... 165/163; 165/154; 165/156; 89/1.11

*Primary Examiner*—Michael Carone

*Attorney, Agent, or Firm*—Anthony T. Lane; Edward Goldberg; Edward F. Costigan

[57] ABSTRACT

A heat exchanger and heater of a tube type is provided for heating a liquid in a coiled type housing having an inlet and an outlet for liquid of various types. Hot materials in a gas flow are introduced into the system and a liquid is vaporized to heat the heat exchanger system. In a second embodiment of the shell type of heat exchanger and heater is used in the heating of the input liquid. The third embodiment of the heat exchanger and heater system utilizes a frusto-conical shell with a heat coil centrally located in the shell, while a fourth embodiment of the heat exchanger and heater utilizes a cylindrical coil for the liquid to be heated and a temperature sensor for sensing the temperature in the system at end point.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HEAT EXCHANGER AND HEATER

GOVERNMENTAL INTEREST

The invention described herein may be manufactured, used, and licensed by or for the Government for Government purposes without payment to me of any royalties thereon.

BACKGROUND AND SUMMARY OF THE INVENTION

This invention relates generally to heat exchanger apparatus, and more particularly to several embodiments of novel heat exchangers and heaters for smoke generators having the capability to provide both hot water and generate smoke.

Currently, smoke is generated without preheating the liquid smoke materials. This is inefficient and costly.

Without preheating the liquid smoke materials, smoke appears as wet and grey comparing with a good quality dry and white smoke. Drippings from the smoke vaporizer and wetting of the ground area also occurred due to large particles which are unable to vaporize, and which fall down quickly by gravitational force.

Especially in the gas turbine smoke generators, smoke materials are injected into a fast moving hot exhaust where the liquid smoke materials do not have sufficient resident time to be evaporated.

As a result, the heat energy available in the gas turbine is not fully utilized to maximize the smoke generation rate. The fall out of liquid particle decreases the yield of smoke and also causes potential safety and environmental problems.

It is an object of this invention to provide a heat exchanger smoke vaporizer and water heater for a smoke generator.

Another object of this invention is to provide a compact vaporizer with a built in heat exchanger.

Still another object of this invention is to provide a novel heat exchanger that can be of a tube and/or shell type which preheats smoke materials from ambient temperature up to the boiling point of the liquid.

A still further object of this invention is to provide a heat exchanger and heater system wherein more dry and white smokes are generated by the same type of generator at the same operating condition than the one without the heat exchanger vaporizer.

To provide a heater exchanger and heater system which is capable of heating other liquid median like water and liquid solution, is another object of this invention.

BRIEF DESCRIPTION OF THE DRAWINGS

These and other objects and attendant advantages of this invention will become more obvious from the following drawings and detailed description in which.

DESCRIPTION OF THE PREFERRED EMBODIMENTS

Figure 1:
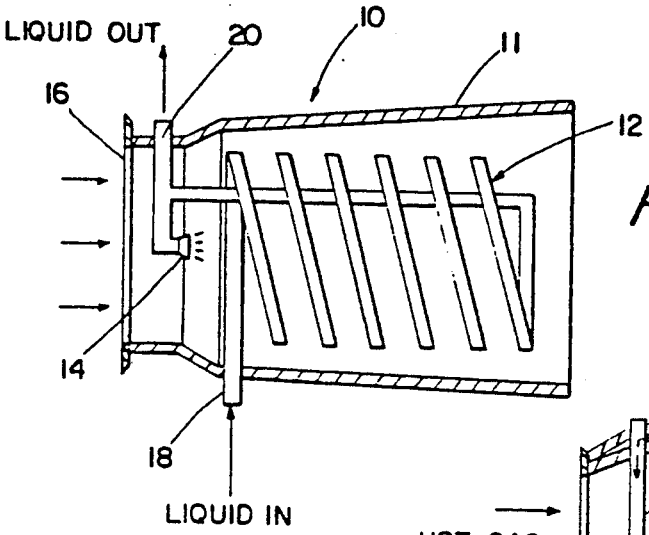
FIG. 1 is a longitudinal side view, of a first embodiment of a partially in cross section, of a tube type heat exchanger smoke vaporizer and water heater for a smoke generator incorporating features of this invention.

Referring now to FIG. 1, there is illustrated a tube type heat exchanger 10 located in a suitable housing 11 and having a suitably mounted coil 12 to an outlet 20. An air from an inlet 18 through the coil 12 to an outlet 20. An air inlet 16 is provided at one end of the tube type heat exchanger 10.

A spray nozzle 14, suitably mounted, is utilized for spraying the liquid in the coil system 12.

The heat exchanger smoke vaporizer and water heater 10 is approximately fourteen (14) inches long with approximately six (6) inches cross section diameter. The heat exchanger coil system 12 is of copper and is located inside the housing 11 so the vaporizer area 14, with approximately 300 square inches surface area.

One end of the heat exchanger and heater system 10 is provided with the flange 16 to match the housing of the exhaust of a gas turbine, not shown.

Liquid smoke materials are passed through the heat exchanger and heater system 10 in counter current flow where the liquid smoke materials are preheated to elevated temperature and then are sprayed into hot exhaust gases through the nozzle 14. Hot liquid requires less resident time to evaporate. As a result, more smoke materials are fully vaporized.

This heat exchanger and water heater 10 operate as a liquid heater by tapping the spray nozzle 14 and opens a tap above the shell or housing 11. Cool liquid, or water is fed into the heat exchanger system or through the inlet 18, with hot water up to the boiling point ban be obtained from the exit and/or outlet 20.

Figure 2:
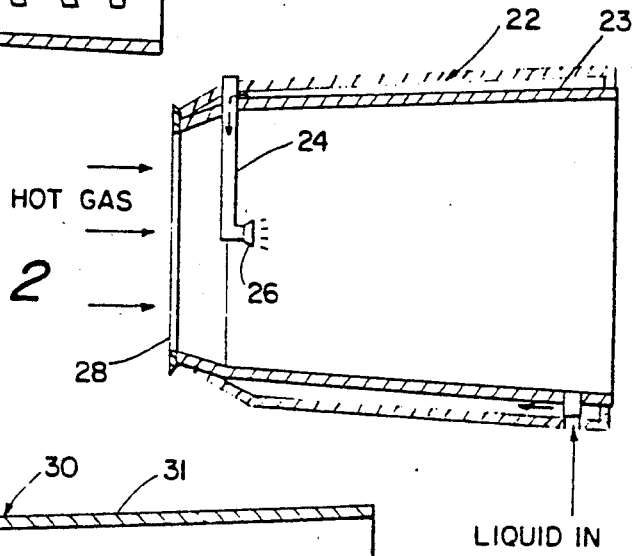
FIG. 2 is a longitudinal side view, of a second embodiment of a shell type heat exchanger smoke generator incorporating features of this invention.

Referring now to FIG. 2, there is illustrated another embodiment of a shell type heat exchanger 22 having a housing 23 with a spray nozzle 26 coupled to a tube 24.

Hot gas from a suitable source, such as the hot outlet of a gas turbine (not shown) are passed through the opening 28 in the shell type heat exchanger 22. Liquid is introduced into the heat exchanger 22 at one end, and is exited from the shell 23 of the heat exchanger through the other end. The liquid is heated as preciously described.

Figure 3:
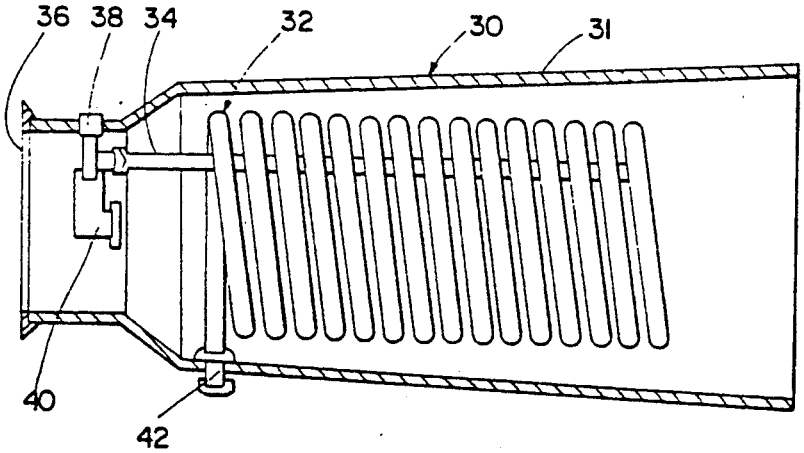
FIG. 3 is a longitudinal side view of a third embodiment of a heat exchanger smoke generator incorporating features of this invention.

Referring now to FIG. 3, there is shown another embodiment of the heat exchanger and heater 30 having a frusto-conical housing 31 having a coil system 32 centrally located therein. An inlet for the liquid is provided, together with an exit tubing 34 and 38 for the hot liquid. A spray nozzle 40 is provided, together with an entrance 36 for the hot gases from the exhaust of a gas turbine (not shown). The heat exchanger and heater system 30 operates in a manner similar to the heat exchanger and heaters 10 and 22 of FIGS. 1 and 2.

Figure 4:
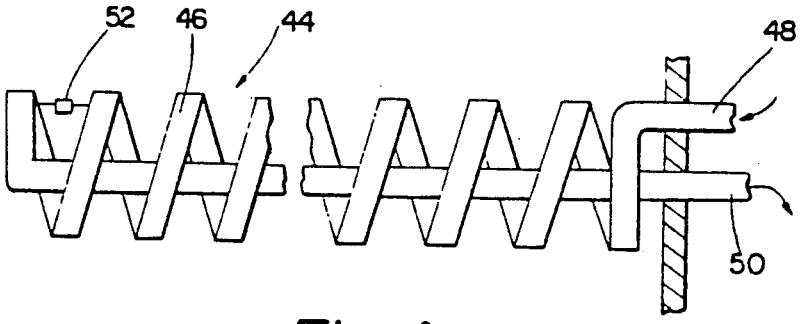
FIG. 4 is a longitudinal side view of a coil system for use in the heat exchanger.

FIG. 4 show schematically a fourth embodiment of the heat exchanger and heater 44 having a cylindrical coil 46 with an inlet 48 and an outlet 50 for the liquid being circulated in the system.

A temperature sensor 52 is provided to sense the temperature of the system at critical points.

Without preheating the liquid smoke materials, smoke appears as wet and grey comparing with a good quality dry and white smoke. Drippings from the smoke vaporizer and wetting of the ground area also occurred due to large liquid particles which are unable to vaporize, and which fall down quickly by gravitational force.

Especially in the gas turbine smoke generators, smoke materials are injected into a fast moving hot exhaust where the liquid smoke materials do not have sufficient resident time to be evaporated.

As a result, the heat energy available in the gas turbine is not fully utilized to maximize the smoke generation rate. The fall out of liquid particle decreases the yield of smoke and also causes potential safety and environmental problems.

Obviously, many modifications and variations of the present invention are possible in light of the above teachings. It is, therefore, to be understood that within the scope of the appended claims the invention may be practiced otherwise than as specifically described.

What is claimed is:

1. A heat exchanger and heater, comprising, a housing, a vaporizer means located in said housing, and inlet and outlet means for a liquid.

2. A heat exchanger and heater of claim 1, wherein one end of said housing is opened to receive a flow of hot and/or cold gases.

3. A heat exchanger and heater of claim 1, wherein a coil is centrally located in said housing for passage of a liquid.

4. A heat exchanger and heater of claim 1, wherein said vaporizer is centrally located with respect to said housing.

5. A heat exchanger and heater as recited in claim 1, and means for sensing the temperature of said liquid.

6. A heat exchanger and heater as recited in claim 1, and a cylindrical shaped coil with said sensing means being coupled in said coil.

* * * * *